(12) United States Patent
Choi et al.

(10) Patent No.: US 9,893,514 B2
(45) Date of Patent: Feb. 13, 2018

(54) SECONDARY BATTERY PACK

(71) Applicant: LG CHEM, LTD., Seoul (KR)

(72) Inventors: Jong Woon Choi, Cheongju-si (KR);
Hyung Gu Yun, Daejeon (KR);
Migeum Choi, Cheongwon-gun (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/167,470

(22) Filed: Jan. 29, 2014

(65) Prior Publication Data

US 2014/0147706 A1 May 29, 2014

Related U.S. Application Data

(63) Continuation of application No. PCT/KR2012/006121, filed on Aug. 1, 2012.

(30) Foreign Application Priority Data

Aug. 9, 2011 (KR) .................. 10-2011-0078994
Feb. 14, 2012 (KR) .................. 10-2012-0014794

(51) Int. Cl.
*H02H 7/18* (2006.01)
*H01M 2/34* (2006.01)
(Continued)

(52) U.S. Cl.
CPC .............. *H02H 7/18* (2013.01); *H01M 2/021* (2013.01); *H01M 2/0212* (2013.01);
(Continued)

(58) Field of Classification Search
CPC ............ H01M 2/0469; H01M 2/0473; H01M 2/0486–2/0495
See application file for complete search history.

(56) References Cited

U.S. PATENT DOCUMENTS

2003/0121142 A1* 7/2003 Kikuchi et al. .............. 29/623.4
2005/0181242 A1* 8/2005 Suzuki et al. .................... 429/7
(Continued)

FOREIGN PATENT DOCUMENTS

EP   1 760 804 A1   3/2007
EP   2 733 775 A2   5/2014
(Continued)

OTHER PUBLICATIONS

KR 2011-0066774 Machine Translation provided by EPO, retrieved Nov. 16, 2015, dated Jun. 17, 2011.*
(Continued)

*Primary Examiner* — Maria Laios
*Assistant Examiner* — Robert S Carrico
(74) *Attorney, Agent, or Firm* — Nutter McClennen & Fish LLP; John J. Penny, Jr.

(57) ABSTRACT

Disclosed herein is a secondary battery pack including a battery cell having an anode terminal and a cathode terminal formed at one face having a sealed surplus portion and a protection circuit module (PCM) electrically connected to the battery cell via the anode terminal and the cathode terminal, wherein the PCM includes a board having a protection circuit formed thereon, the board being provided with an anode terminal connection part and a cathode terminal connection part connected to the anode terminal and the cathode terminal, respectively, a PCM case configured to receive the board through an open face thereof so that the PCM case surrounds the board, and an electrically insulative lid to close the open face of the PCM case.

19 Claims, 6 Drawing Sheets

(51) Int. Cl.
  *H01M 2/30* (2006.01)
  *H01M 2/04* (2006.01)
  *H01M 2/02* (2006.01)
  *H01M 10/42* (2006.01)
  *H01M 10/04* (2006.01)

(52) U.S. Cl.
  CPC ....... *H01M 2/0277* (2013.01); *H01M 2/0285* (2013.01); *H01M 2/0287* (2013.01); *H01M 2/0404* (2013.01); *H01M 2/30* (2013.01); *H01M 2/34* (2013.01); *H01M 10/04* (2013.01); *H01M 10/425* (2013.01); *H01M 2/0267* (2013.01); *H01M 10/0436* (2013.01); *H01M 2200/00* (2013.01); *Y10T 29/4911* (2015.01)

(56) References Cited

U.S. PATENT DOCUMENTS

| | | | |
|---|---|---|---|
| 2006/0035141 A1* | 2/2006 | Lee | H01M 2/021 429/176 |
| 2010/0323238 A1 | 12/2010 | Takahashi et al. | |
| 2011/0086243 A1 | 4/2011 | Bae et al. | |
| 2011/0086244 A1* | 4/2011 | Baek et al. | 429/7 |
| 2012/0276420 A1 | 11/2012 | Baek et al. | |
| 2013/0149563 A1* | 6/2013 | Lee | H01M 2/0469 429/7 |
| 2014/0147707 A1 | 5/2014 | Choi et al. | |

FOREIGN PATENT DOCUMENTS

| | | |
|---|---|---|
| JP | 2003-19569 A | 1/2003 |
| JP | 2006-12769 A | 1/2006 |
| JP | 2006-228715 A | 8/2006 |
| JP | 2007-48725 A | 2/2007 |
| JP | 2008-159555 A | 7/2008 |
| JP | 2009-252371 A | 10/2009 |
| JP | 2010-537368 A | 12/2010 |
| JP | 2011-70906 A | 4/2011 |
| JP | 2014-522089 A | 8/2014 |
| KR | 2001-196048 A | 7/2001 |
| KR | 10-2010-0121336 A | 11/2010 |
| KR | 10-2010-0135046 A | 12/2010 |
| KR | 10-2011-0023988 A | 3/2011 |
| KR | 10-2011-0040670 A | 4/2011 |
| KR | 10-2011-0066774 A | 6/2011 |

OTHER PUBLICATIONS

International Search Report issued in PCT/KR2012/006121, dated Jan. 28, 2013.

* cited by examiner

SECONDARY BATTERY PACK

CROSS REFERENCE TO RELATED APPLICATIONS

This application is a Bypass Continuation of PCT International Application No. PCT/KR2012/006121 filed on Aug. 1, 2012, which claims priority under 35 U.S.C § 119(a) to Patent Application No. 10-2011-0078994 filed in the Republic of Korea on Aug. 9, 2011, and under 35 U.S.C § 119(a) to Patent Application No. 10-2012-0014794 filed in the Republic of Korea on Feb. 14, 2012, all of which are hereby expressly incorporated by reference into the present application.

TECHNICAL FIELD

The present invention relates to a secondary battery pack.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent preservation and service-life characteristics, which has been widely used as an energy source for various electronic products as well as various kinds of mobile devices.

Depending upon kinds of devices in which secondary batteries are used, the secondary batteries may be configured to have a detachable type structure in which the secondary batteries can be easily inserted into and removed from external devices or to have an embedded type structure in which the secondary batteries are embedded in the devices. For example, secondary batteries used in the conventional mobile devices are configured to have a detachable type structure in which it is possible for a user to insert or remove a battery into or from each device. On the other hand, secondary batteries used in devices, such as some mobile phones, tablet PCs, and smart pads, may be configured to have an embedded type structure.

Lithium secondary batteries are widely used as such secondary batteries. Each of the secondary batteries includes an anode terminal and a cathode terminal electrically connected to a device, in which the secondary battery is mounted, and a safety element to effectively control an abnormal state, such as overcharge or overcurrent, of the secondary battery. Examples of the safety element may include a positive temperature coefficient (PTC) element, a protection circuit module (PCM), a fuse, and a thermal cutoff (TCO) element.

Generally, a safety element, such as a PCM, is connected to a battery cell, including an anode terminal and a cathode terminal, via a conductive nickel plates by welding or soldering. For example, the nickel plates are connected to the electrode terminals of the battery cell by welding or soldering, a protection circuit board (PCB) is attached to one side of a double-sided tape, a protective tape is attached to the other side of the double-sided tape, and electrode tabs of the PCB and the nickel plates are connected to each other by welding in a state in which the PCB is in tight contact with the battery cell. In this way, the PCM is connected to the battery cell to manufacture a battery pack.

It is required for the PCM to be maintained in electrical connection with the electrode terminals of the battery cell and, at the same time, to be electrically isolated from other parts of the battery cell. To this end, insulative tapes are attached to various members, including the PCM. In addition, a sealed portion of a battery case is partially bent, and an insulative tape is attached thereon or a barcode is printed thereon. That is, the process is very complicated.

Since a plurality of insulative tapes or parts is required to achieve safe connection between the safety element and the battery cell as described above, a battery pack assembly process is complicated, and manufacturing cost is increased. Also, when external impact is applied to a battery pack, the PCM may be damaged or dimensional stability may be greatly lowered due to the use of the insulative tapes, which exhibit low mechanical strength.

DISCLOSURE

Technical Problem

It is an object of the present invention to provide a secondary battery pack that is capable of covering a protection circuit board of a secondary battery cell using an electrically insulative case, thereby protecting the protection circuit board from external impact, insulating the protection circuit board, and preventing electrode terminals of the secondary battery cell from being exposed outside.

It is another object of the present invention to provide a secondary battery pack that is capable of reducing the number of parts necessary to constitute the battery pack, thereby simplify an assembly process and exhibiting excellent structural stability.

It is another object of the present invention to provide a secondary battery pack configured to have a structure in which a protection circuit module including a protection circuit board and a case, in which the protection circuit board is disposed, is mounted to an outer circumference of a battery cell, thereby providing maximum capacity in the same standard.

It is a further object of the present invention to provide a protection circuit module that is capable of a protection circuit module that is capable of protecting a safety element from external impact, exhibiting dimensional stability, and preventing wrinkles from being formed at an outer face of a battery pack.

Technical Solution

A secondary battery pack according to an embodiment of the present invention includes a battery cell having an anode terminal and a cathode terminal formed at one face having a sealed surplus portion and a protection circuit module (PCM) electrically connected to the battery cell via the anode terminal and the cathode terminal.

In this embodiment, the PCM may include a board having a protection circuit formed thereon, the board being provided with an anode terminal connection part and a cathode terminal connection part connected to the anode terminal and the cathode terminal, respectively, a PCM case configured to receive the board through an open face thereof so that the PCM case surrounds the board, and an electrically insulative lid to close the open face of the PCM case.

In this embodiment, the board may be coupled to the anode terminal and the cathode terminal of the battery cell via the anode terminal connection part and the cathode terminal connection part, the board may be disposed in the PCM case in a state in which the board is parallel to the battery cell, the open face of the PCM case may be closed by the electrically insulative lid, and the PCM case may be mounted to the sealed surplus portion of the battery cell.

In this embodiment, the PCM case and the lid may be coupled to each other through an assembly type fastening structure. The PCM case may be provided with at least one fastening groove for coupling with the lid, and the lid is provided with at least one fastening protrusion corresponding to the at least one fastening groove of the PCM case. Alternatively, a person having ordinary skill in the art to which the present invention pertains will appreciate that the PCM case may be provided with at least one fastening protrusion (for example, hook), and the lid may be provided with at least one fastening groove corresponding to the at least one fastening protrusion of the PCM case, or fastening protrusions and fastening grooves may be alternately formed at the PCM case and the lid. That is, the fastening structure to couple the PCM case and the lid is not particularly restricted so long as the PCM case and the lid can be coupled to each other.

In this embodiment, the battery cell may be a plate-shaped battery cell, and the anode terminal and the cathode terminal may be plate-shaped conductive members.

In this embodiment, the board may further include an external input and output terminal. The external input and output terminal may be formed at the board at which the anode terminal connection part and the cathode terminal connection part are formed via an interconnection part.

Also, the external input and output terminal may be formed on the board at which the anode terminal connection part and the cathode terminal connection part are formed. The PCM case may further include a groove, through which the external input and output terminal is drawn, formed at a face adjacent to the open face thereof.

In this embodiment, the secondary battery pack may further include an insulative tape additionally attached to an electrode terminal exposure region of the sealed surplus portion. The insulative tape may be, for example, a double-sided tape.

In this embodiment, the secondary battery pack may further include an insulative tape additionally attached to at least one of outer faces of the PCM case.

In this embodiment, the battery cell may be configured to have a structure in which an electrode assembly, including cathodes, anodes, and separators respectively disposed between the cathodes and the anodes, is disposed in a battery case made of a laminate sheet including a metal layer and a resin layer in a sealed state.

In this embodiment, the board may be disposed in the PCM case in a state in which the board is parallel to the battery cell in an extension direction identical to an extension direction of the sealed surplus portion.

In this embodiment, the secondary battery pack may further include a nickel plate additionally mounted to one face of the cathode terminal, to which the cathode terminal connection part of the board is coupled, by ultrasonic welding.

In this embodiment, the secondary battery pack may further include a label to cover the battery cell. The label may be configured to have a structure to cover sealed outer circumferences of the battery cell.

A protection circuit module according to another embodiment of the present invention includes a protection circuit board having an anode terminal connection part and a cathode terminal connection part connected to an anode terminal and a cathode terminal of a battery cell, respectively, a PCM case configured to receive the protection circuit board through an open face thereof, and an electrically insulative lid to close the open face of the PCM case.

In the protection circuit module according to this embodiment, the protection circuit board may be coupled to the anode terminal and the cathode terminal of the battery cell via the anode terminal connection part and the cathode terminal connection part, the board may be disposed in the PCM case in a state in which the board is parallel to the battery cell, the open face of the PCM case may be closed by the electrically insulative lid, and the PCM case may be mounted to the sealed surplus portion of the battery cell.

In the protection circuit module according to this embodiment, the PCM case and the lid may be coupled to each other through an assembly type fastening structure. The PCM case may be provided with at least one fastening groove for coupling with the lid, and the lid may be provided with at least one fastening protrusion corresponding to the at least one fastening groove of the PCM case.

In the protection circuit module according to this embodiment, the PCM case may be configured to have a hollow box structure opened at one face thereof.

In the protection circuit module according to this embodiment, the protection circuit board may further include an external input and output terminal coupled to the board at which the anode terminal connection part and the cathode terminal connection part are formed via an interconnection part. The PCM case may further include a groove, through which the interconnection part extends, formed at a face adjacent to the open face thereof.

A method of manufacturing a secondary battery pack according to another embodiment of the present invention includes a step of forming a battery cell configured to have a structure in which an electrode assembly, including cathodes, anodes, and separators respectively disposed between the cathodes and the anodes, is disposed in a battery case in a sealed state, one of sealed outer circumferences of the battery cell having a surplus portion, a step of receiving a board into a case opened at one face thereof in an extension direction identical to an extension direction of the sealed surplus portion in a state in which the board is parallel to the battery cell and closing the open face of the case using an electrically insulative lid, and a step of mounting the case to the sealed surplus portion of the battery cell.

A secondary battery pack according to a further embodiment of the present invention includes a battery cell having an anode terminal and a cathode terminal formed at one face having a sealed surplus portion and a protection circuit module (PCM) electrically connected to the battery cell via the anode terminal and the cathode terminal.

In this embodiment, the PCM may include a board having a protection circuit formed thereon, the board being provided with an anode terminal connection part and a cathode terminal connection part connected to the anode terminal and the cathode terminal, respectively, and a PCM case configured to receive the board through an open face thereof so that the PCM case surrounds the board, In this embodiment, the board may be coupled to the anode terminal and the cathode terminal of the battery cell via the anode terminal connection part and the cathode terminal connection part, the board may be disposed in the PCM case in a state in which the board is perpendicular to the battery cell, and the PCM case, in which the board is disposed, may be mounted to the sealed surplus portion of the battery cell, and the PCM may further include an electrically insulative lid to close the open face of the PCM case.

Advantageous Effects

As is apparent from the above description, the secondary battery pack according to the present invention is configured so that the protection circuit board is disposed in the electrically insulative case. Consequently, it is possible to protect and insulate the protection circuit board. Also, it is possible to easily prevent the electrode terminals from being exposed outside without insulation of the electrode terminal through the use of additional members.

Also, the secondary battery pack according to the present invention is configured to have a structure in which the PCM, in which the protection circuit board is disposed in a single case, is mounted to the sealed surplus portion of the battery cell. Consequently, it is possible to effectively protect the PCM and to greatly improve manufacturing efficiency.

Furthermore, the secondary battery pack according to the present invention is configured to have a structure in which the protection circuit board is mounted in the case. Consequently, it is possible to easily manufacture the secondary battery pack, to relatively reduce a defect rate, and to configure the secondary battery pack so that the secondary battery pack has no wrinkles formed at the outer face thereof, i.e. a neat and clean external appearance.

In addition, the secondary battery pack according to the present invention is configured to have a structure in which the protection circuit board is mounted to one of the outer circumferences, e.g. one of the sealed portions, of the battery cell. Consequently, it is possible to reduce the length of the sealed portion and to increase the capacity of the secondary battery pack per unit volume.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the embodiments will be described only for a better understanding of the present invention, and therefore, the scope of the present invention is not limited by the illustrated embodiments.

A secondary battery pack according to an embodiment of the present invention includes a battery cell having four sealed outer circumferences and a safety element mounted to a sealed outer circumference having a surplus portion, which is one of the outer circumferences. A safety element according to an embodiment of the present invention may include a first safety element and a second safety element. The first safety element may be a protection circuit, and the second safety element may be a positive temperature coefficient (PTC) element, a fuse, or a thermal cutoff (TCO) element.

Also, the second safety element may be mounted in a protection circuit module (PCM) in the form of a part.

The safety element according to the embodiment of the present invention may be a PCM. The PCM may include a protection circuit board and a case, in which the protection circuit board is disposed. In addition, the PCM may also include an electrically insulative lid to close an open face of the case. For the convenience of description, a PCM will be described as being adopted as the safety element, and the PCM will be described as including a protection circuit board (PCB) in this specification, to which, however, the safety element according to the embodiment of the present invention is not limited.

Figure 1:
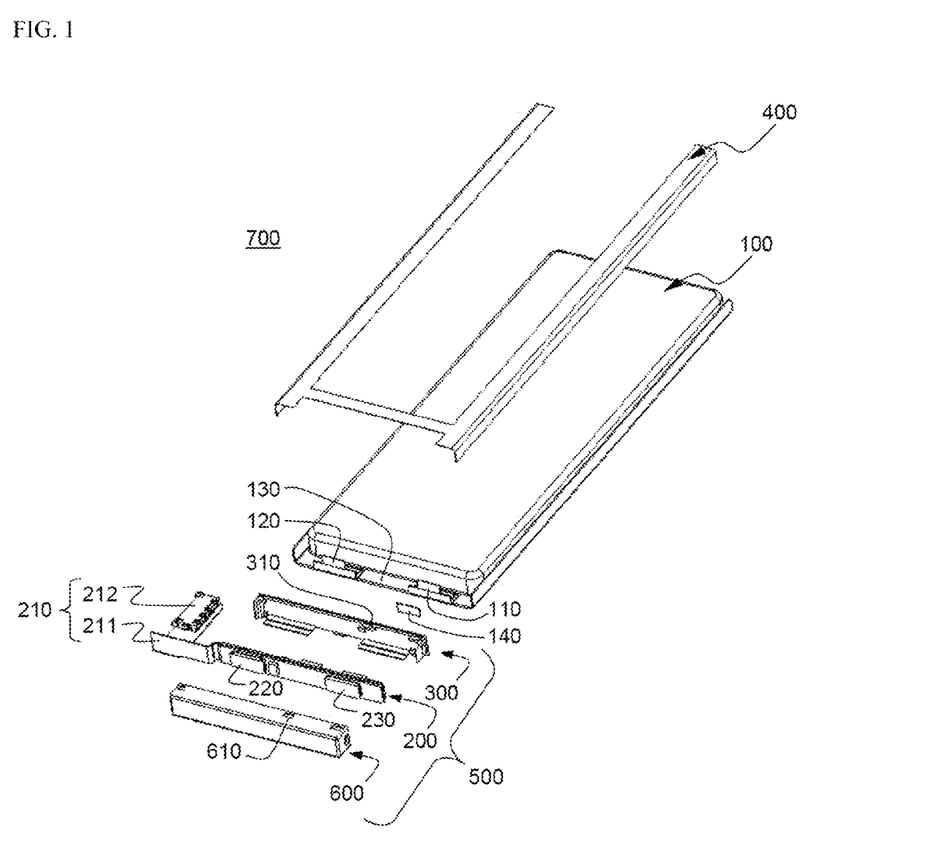
FIG. 1 is an exploded perspective view of a secondary battery pack according to an embodiment of the present invention.

Hereinafter, a secondary battery pack according to an embodiment of the present invention will be described with reference to FIG. 1. FIG. 1 typically shows an exploded perspective view of a secondary battery pack according to an embodiment of the present invention.

Referring to FIG. 1, a secondary battery pack 700 may include an anode terminal 120, a cathode terminal 110, a battery cell 100, a PCM 500, and a label 400.

A battery cell 100 according to an embodiment of the present invention is a pouch-shaped battery cell configured so that an electrode assembly of a cathode/separator/anode structure is disposed in a battery case made of a laminate sheet including a metal layer and a resin layer in a sealed state, to which, however, the battery cell according to the embodiment of the present invention is not limited.

Referring to FIG. 1, the battery cell 100 includes a sealed surplus portion 130 formed at one face thereof and an anode terminal 120 and a cathode terminal 110 exposed to the sealed surplus portion 130. The term 'face' used in this specification indicates an arbitrary face of a tetrahedron with four faces, and is understood as including a side, a section, or an end. Also, in this specification, a sealed portion having a surplus space formed at one of the sealed outer circumferences formed when an electrode assembly is disposed in a battery case made of a laminate sheet in a sealed state is referred to as a sealed surplus portion 130. However, a person having ordinary skill in the art to which the present invention pertains will appreciate that the sealed surplus portion may be replaced by terms, such as a thermal welded surplus portion and a sealed terrace, as long as the specified terms have the same meaning as the sealed surplus portion.

An electrically insulative lid 300 according to an embodiment of the present invention is configured to have a structure to close an open face of a PCM case 600. As show in FIG. 1, the electrically insulative lid 300 is provided with hooks 310 corresponding to fastening grooves 610 of the PCM case 600, and the PCM case 600 is provided with fastening grooves 610 corresponding to the hooks 310 of the electrically insulative lid 300. Consequently, the PCM case 600 and the electrically insulative lid 300 may be coupled to each other through an assembly type fastening structure.

Figure 5:
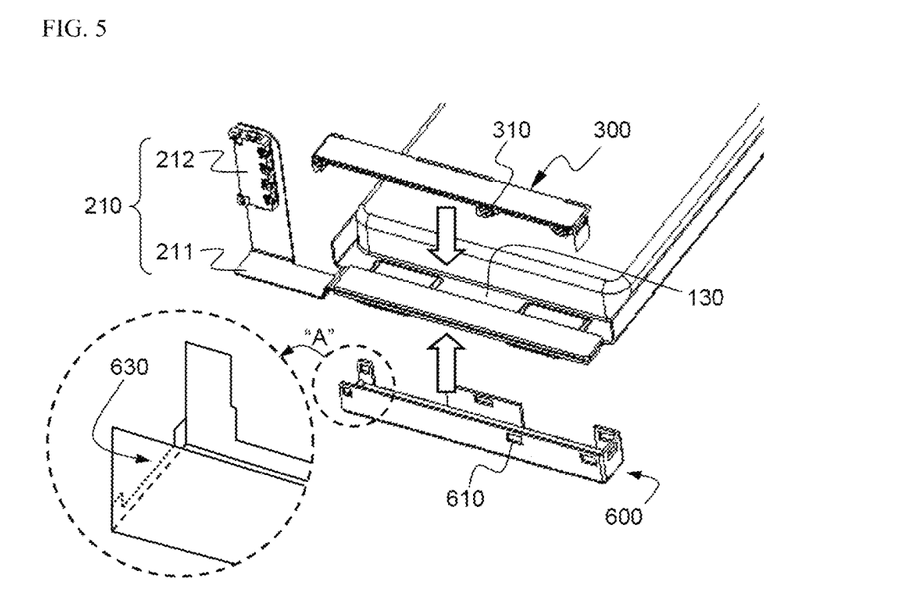

The PCM case 600 and the electrically insulative lid 300 may be mounted to the battery cell in a state in which the opening faces to the side as shown in FIG. 1 or in an arrow direction as shown in FIG. 5. Also, the PCM case and the lid may be mounted to the battery cell in a state in which the board is perpendicular to the battery cell as well as in a state in which the board is parallel to the battery cell, as previously described.

An anode terminal 120 and a cathode terminal 110 according to an embodiment of the present invention are plate-shaped conductive members. The anode terminal 120 and the cathode terminal 110 are electrically connected to a PCB 200 of a PCM 500, which will hereinafter be described.

A PCM 500 according to an embodiment of the present invention may include a PCB 200 having a protection circuit, an electrically insulative PCM case 600, in which the PCB 200 is disposed, and an external input and output terminal 210.

Referring to FIG. 1, the PCB 200 is a board including a protection circuit. The PCB may be referred to as a protection circuit board or simply a board. The PCB 200 may further include an anode terminal connection part 220 connected to the anode terminal 120 of the battery cell 100 and a cathode terminal connection part 230 connected to the cathode terminal 110 of the battery cell 100 on the board in addition to the protection circuit to control overcharge, overdischarge, and overcurrent of the battery. In addition to the protection circuit and the two connection parts 220 and 230, the PCB 200 may further include an external input and output terminal 210 connected to the board via an interconnection part 211 connected to one end of the board, as shown in FIG. 1.

An external input and output terminal 210 according to an embodiment of the present invention is not particularly restricted so long as the external input and output terminal can be electrically connected to the PCB 200 to supply current from an external device, such as a charger, to the battery cell 100 or to supply current from the battery cell 100 to an external device, such as a mobile phone, an MP3 player, etc. For example, the external input and output terminal 210 may be configured to have a plate structure having a connector 212 mounted to one end thereof.

Figure 9:
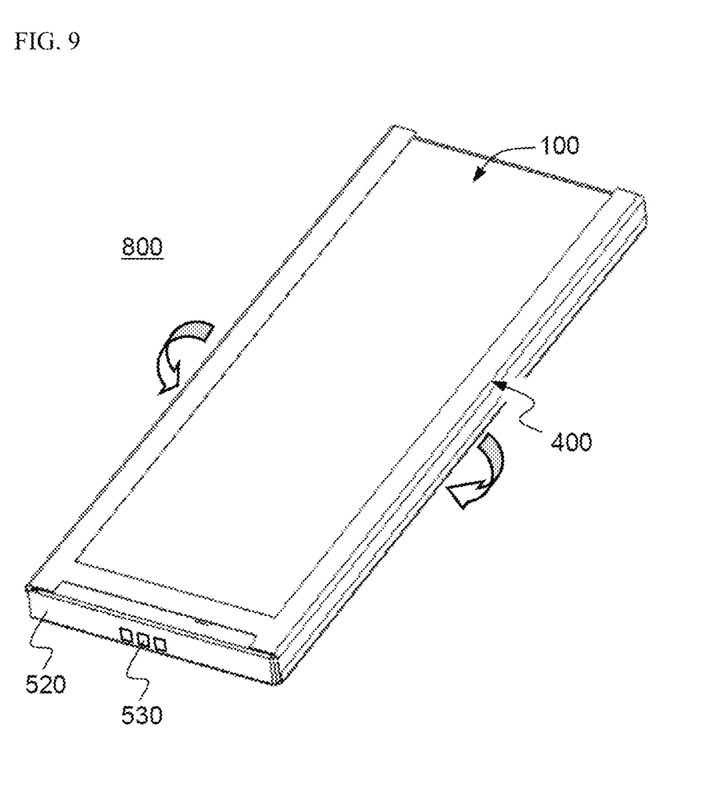
FIG. 9 is a perspective view of a secondary battery pack according to another embodiment of the present invention.

Also, unlike the embodiment shown in FIG. 1, the external input and output terminal may be formed on the board on which the anode terminal connection part and the cathode terminal connection part are formed without being connected to the PCB 200 via the interconnection part. A secondary battery pack with the above-stated construction is shown in FIG. 9. In a case in which an external input and output terminal is formed on a PCB, openings are formed at a region of a PCM case 520 (see FIG. 9), in which the PCB is disposed, corresponding to an external input and output terminal 530 (see FIG. 9). The external input and output terminal may be electrically connected to an external device through the openings.

An anode terminal connection part 220 according to an embodiment of the present invention may include a part coupled to the PCB 200 and an extension part that can be bent when the anode terminal connection part 220 is connected to the anode terminal 120 of the battery cell 100. In the same manner, a cathode terminal connection part 230 according to an embodiment of the present invention may include a part coupled to the PCB 200 and an extension part that can be bent when the cathode terminal connection part 230 is connected to the cathode terminal 110 of the battery cell 100.

As shown in FIG. 1, the external input and output terminal 210 according to the embodiment of the present invention is configured to have a plate structure having a connector 212 mounted to one end thereof, to which, however, the external input and output terminal 210 is not limited. Also, as shown in FIG. 1, the external input and output terminal 210 is configured to face in a direction opposite to a direction in which the anode terminal connection part 220 and the cathode terminal connection part 230 face, which, however, is only an example. According to another embodiment of the present invention, the external input and output terminal 210 may be configured to face in the same direction as a direction in which the anode terminal connection part 220 and the cathode terminal connection part 230 face. Also, the external input and output terminal may be located at the cathode terminal connection part side.

A PCM case 600 according to an embodiment of the present invention is configured to have a hollow box structure opened at one face thereof so that the PCB 200 can be mounted in the PCM case 600 through the open face. Consequently, dimensional stability of the PCM case 600 is high, and it is possible to greatly reduce mounting time and process. Here, the mounting time means time required for an assembly process of placing the PCB 200 in the PCM case 600 and assembling the PCB 200 with the PCM case 600. Reduction of the mounting time means reduction of time required for the assembly process, and therefore, it is possible to greatly simplify the process.

The PCM case 600 may have a size sufficient to receive and surround the PCB 200 mounted on the sealed surplus portion 130 of the battery cell 100. The size of the PCM case 600 may be greater or less than that of the sealed surplus portion 130. A person having ordinary skill in the art to which the present invention pertains will appreciate that the size of the PCM case 600 may be properly adjusted based on the capacity and shape of the battery cell. In addition, in a case in which the PCB 200 includes the external input and output terminal 210 connected thereto via the interconnection part 211, as shown in FIG. 1, an opening 630 (see FIG. 5), through which the external input and output terminal 210 is exposed, may be formed at a face of the PCM case 600 adjacent to the open face.

A secondary battery pack according to another embodiment of the present invention may be configured so that a safety element is further mounted between at least one of the electrode terminals, i.e. the anode terminal and/or the cathode terminal, of the battery cell and the PCB. In this case, the safety element may be disposed between, for example, the anode terminal of the battery and the PCB. The safety element is mounted in the PCM case together with the PCB so that the structural stability of the safety element is secured.

Consequently, it is possible to directly connect the cathode terminal of the battery cell to the cathode terminal connection part of the PCB and to connect one side of the safety element to the safety element connection part disposed on the same face of the PCB in a state in which the anode terminal is connected to the other side of the safety element without shape deformation or further use of additional members, and therefore, it is possible to stably mount the safety element, the structural strength is low, to the PCB, thereby reducing a defect rate in a manufacturing process and improving manufacturing efficiency.

The safety element is a member which interrupts current when the temperature of the battery cell is increased to secure safety. For example, the safety element may be a PTC element, the resistance of which increases as the temperature of the battery cell is increased, or a fuse, which is broken when the temperature of the battery cell is increased. However, the safety element is not limited to the PTC element and the fuse.

Hereinafter, a method of manufacturing the secondary battery pack shown in FIG. 1 will be described with reference to FIGS. 2 to 8. FIGS. 2 to 8 are various perspective views of a secondary battery pack illustrating a method of manufacturing the secondary battery pack.

Figure 2:
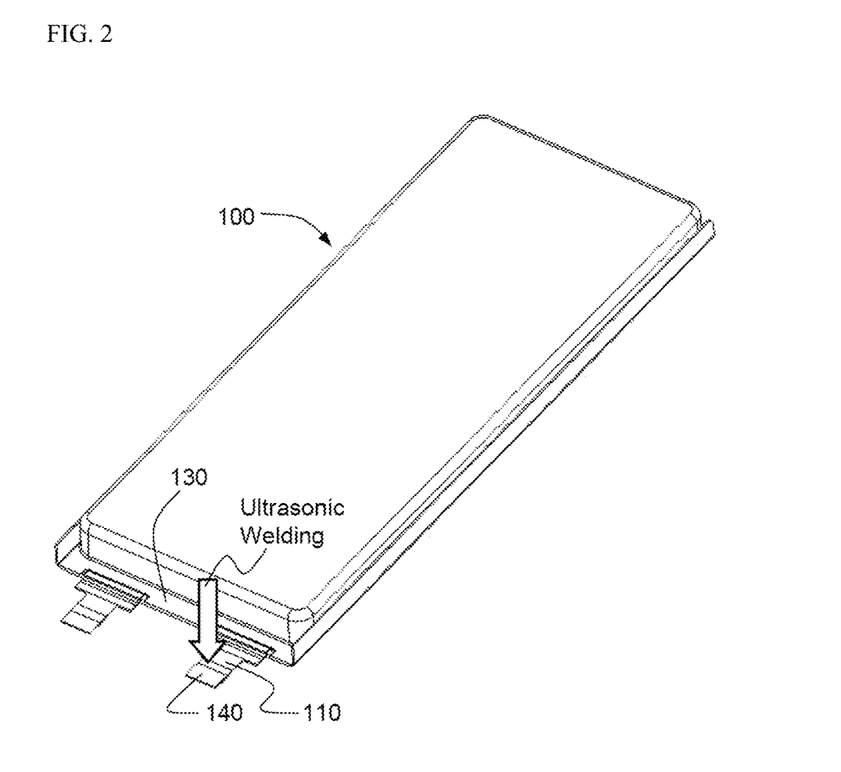
FIGS. 2 to 8 are perspective views showing a method of manufacturing the secondary battery pack of FIG. 1.

Referring first to FIG. 2, a surplus portion, i.e. a sealed surplus portion 130, is formed at one of sealed faces of a battery cell 100, and an anode terminal 120 and a cathode terminal 110 of the battery cell 100 are disposed on the sealed surplus portion 130. The sealed surplus portion 130 has a size sufficient to receive a PCM 500, in which a PCB 200 is coupled with a PCM case 600. A person having ordinary skill in the art to which the present invention pertains will appreciate that the size of the sealed surplus portion 130 may be properly adjusted based on the capacity and shape of the battery cell.

Subsequently, as shown in FIG. 2, a nickel plate 140 may be coupled to a portion of the cathode terminal 110, for example, by ultrasonic welding. In a case in which the nickel plate 140 is mounted to the cathode terminal 110, it is possible to prevent deterioration of weldability between the cathode terminal, made of aluminum, of the battery cell and a PCB cathode terminal connection part made of nickel due to different properties.

Also, in another embedment of the present invention, as previously described, an additional safety element, such as a PTC element, may be selectively mounted between the anode terminal 120 and an anode terminal connection part 220 to secure stability.

Figure 3:
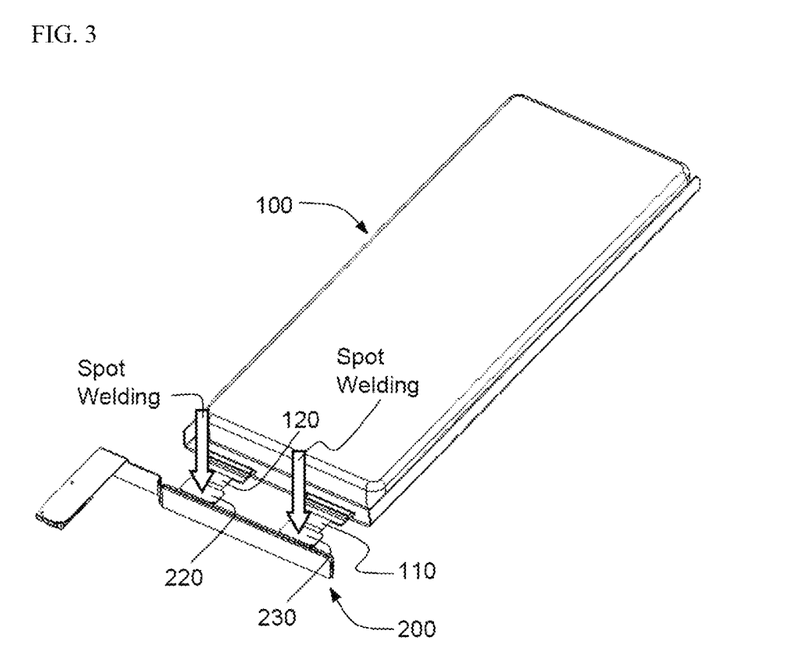

Subsequently, as shown in FIG. 3, the anode terminal connection part 220 and a cathode terminal connection part 230 formed at the PCB 200 are welded to the anode terminal 120 and the cathode terminal 110 of the battery cell 100, respectively, for example, by spot welding. In a case in which the nickel plate 140 is welded to the cathode terminal 110 as shown in FIG. 2, the cathode terminal connection part 230 is welded to the nickel plate 140.

Since the anode terminal connection part 220 and the cathode terminal connection part 230 each include a part coupled to the PCB 200 and a bendable extension part as described above, the anode terminal connection part 220 and the cathode terminal connection part 230 of the PCB 200 may be coupled to the anode terminal 120 and the cathode terminal 110 of the battery cell 100, respectively, by welding so that the PCB 200 is opposite to one face of the battery cell 100 at which the sealed surplus portion 130 is formed, as can be seen from FIG. 3.

Figure 4:
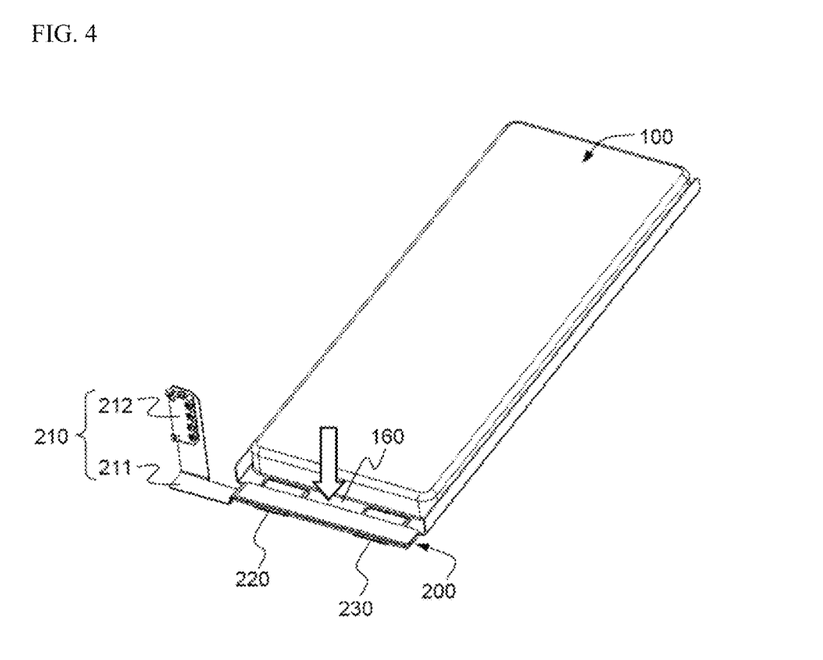

Referring to FIG. 4 together with FIG. 1, after the anode terminal connection part 220 and the cathode terminal connection part 230 are bent, an adhesive tape 160, serving as an insulation tape, may be attached to an electrode terminal exposure region of the sealed surplus portion 130 of the main body of the battery cell 100. In a case in which the insulation tape is further attached to the electrode terminal exposure region of the sealed surplus portion 130 as described above, it is possible to more effectively improve insulativity of the electrode terminal exposure region. Also, in a case in which the insulation tape is a double-sided tape, the double-side tape provides coupling force between the PCM case and the sealed surplus portion when the PCM case is mounted to the PCB, thereby further improving structural stability.

In the embodiment of the present invention, the PCB 200, connected to the battery cell 100 via the anode terminal connection part and the cathode terminal connection part, may be disposed in the PCM case in a state in which the PCB 200 is parallel to the battery cell 100, and may be mounted to the sealed surplus portion of the battery cell 100. Here, the state in which the PCB 200 is parallel to the battery cell 100 may be, for example, a state in which the anode terminal connection part 220 and the cathode terminal connection part 230, connected to the anode terminal and the cathode terminal of the battery cell, are disposed so as to face upward as shown in FIG. 4. In this case, as shown in FIG. 4, the PCB 200 may be spaced apart from the end of the battery cell at which the sealed surplus portion is formed by the connection length between the anode terminal and the anode terminal connection part and between the cathode terminal and the cathode terminal connection part in the longitudinal direction so that the PCB 200 is parallel to the sealed surplus portion.

In other words, in a case in which the PCB 200 is disposed in parallel to the battery cell, as shown in FIG. 4, the face of the PCB 200 at which the anode terminal connection part 220 and the cathode terminal connection part 230 are located, faces upward with the result that two widest ones of the four faces constituting the external appearance of the PCB 200 face upward and downward. Also, since the two widest ones of the four faces constituting the external appearance of the PCB 200 face upward and downward, the two widest faces of the PCB 200 and two widest faces of the battery cell 100 are disposed so as to face in the same directions. Consequently, that the PCB 200 is disposed in parallel to the battery cell 100 may be understood as including the above-mentioned positional relationship.

Figure 6:
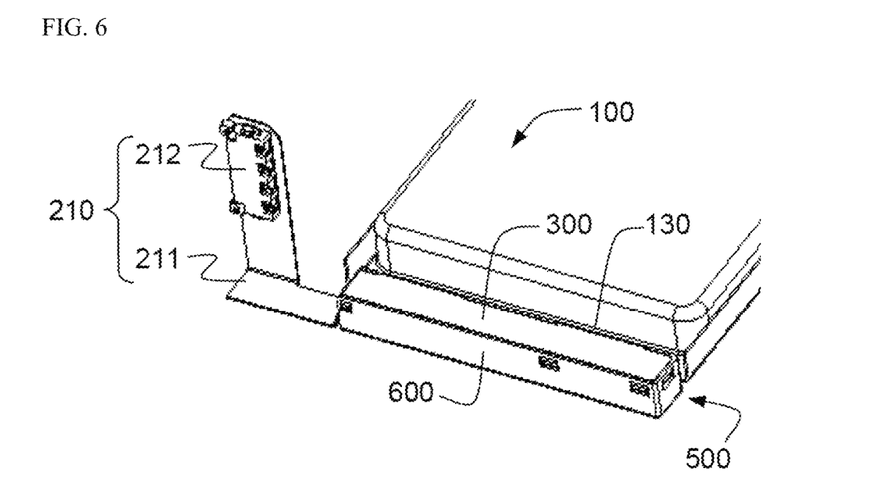

Referring to FIGS. 5 and 6, the board may be disposed in the PCM case in a state in which the board is parallel to the battery cell in an extension direction identical to an extension direction of the sealed surplus portion. As previously described in connection with FIG. 1, the PCM case 600 is opened at one face thereof so that the PCM case 600 receives the PCB 200 through the open face, and the electrically insulative lid may close the open face of the PCM case 600. As shown in FIG. 5, the electrically insulative lid 300 is provided with the hooks 310 corresponding to the fastening grooves 610 of the PCM case 600, and the PCM case 600 is provided with the fastening grooves 610 corresponding to the hooks 310 of the electrically insulative lid 300. Consequently, the PCM case 600 and the electrically insulative lid 300 may be coupled to each other through an assembly type fastening structure. Also, in a case in which the external input and output terminal 210 is connected to the connection parts of the PCB 200 via the interconnection part as shown in FIG. 1, a groove 630 may be formed at one face of the PCM case 600 corresponding to the interconnection part 211 of the PCB 200 so that the external input and output terminal 210 is exposed outside. Since the interconnection part 211 of the PCB 200 extends through the groove 630, the external input and output terminal 210 connected to the interconnection part 211 is exposed outside.

Figure 7:
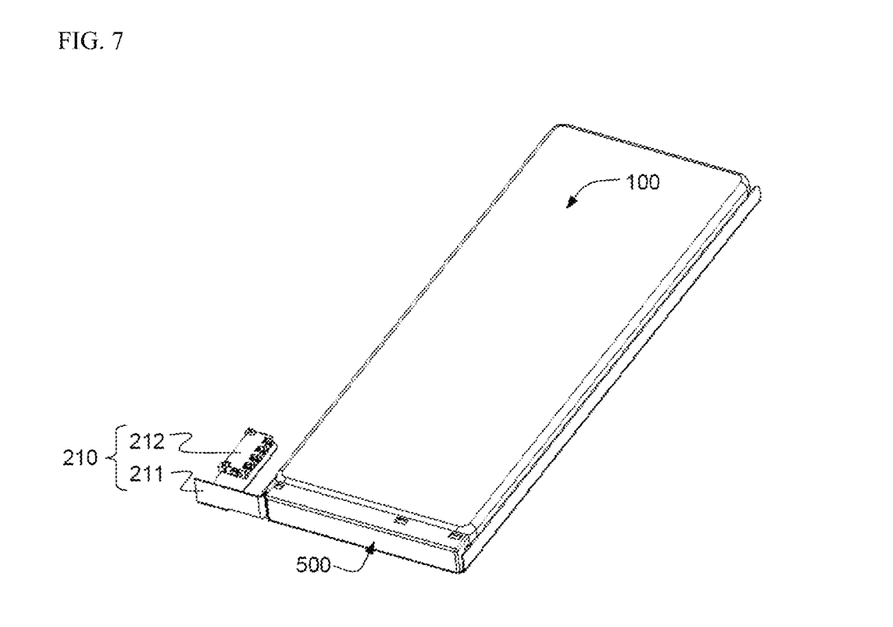

Referring to FIG. 7 together with FIGS. 5 and 6, the anode terminal 120 and the cathode terminal 110 are bent toward one face of the battery cell at which the sealed surplus portion 130 is formed so that the PCM case 600 is mounted to the sealed surplus portion 130 of the battery cell 100.

Figure 8:
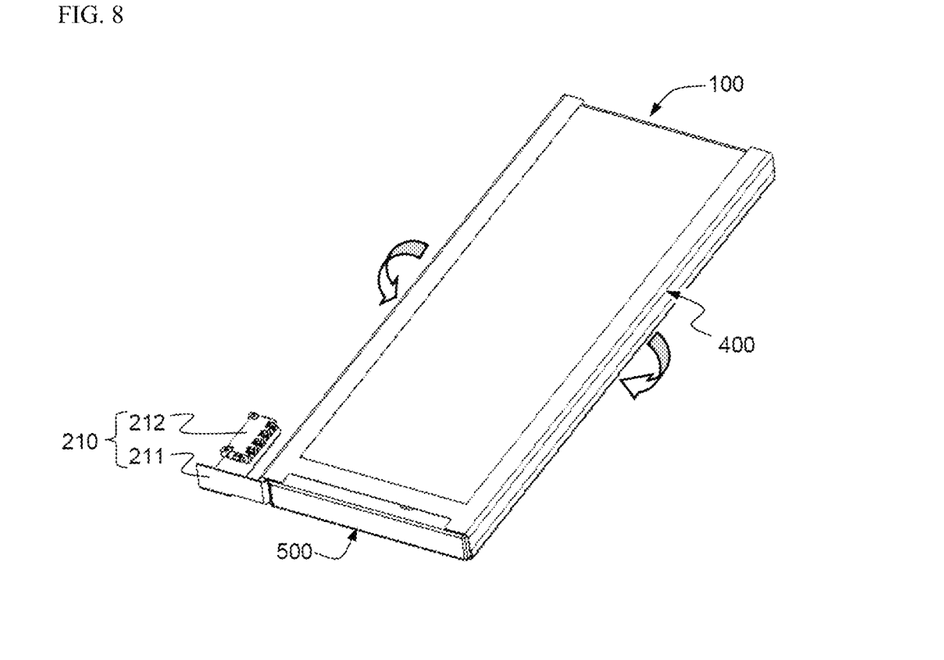

FIG. 8 is a view showing a state in which a label 400 covers the PCM and the battery cell 100 in a state in which the PCM is mounted to sealed surplus portion 130 of the battery cell 100. The label 400 according to the present invention may be configured to cover the outer faces of the PCM case 600 and the sealed outer circumferences of the battery cell 100 (see arrow directions in FIG. 8) so that the external input and output terminal can be exposed outside. For example, as shown in FIG. 8, the label 500 may be attached to cover the outer faces of the PCM 500 and the sealed outer circumferences of the battery cell 100 excluding the external input and output terminal 210 exposed outside.

In a case in which the label 400 is attached to the battery cell, it is possible to stably fix the sealed outer circumferences of the battery cell to the main body of the battery cell while maintaining the overall insulation state, thereby more stably securing the electrical connection state between the electrode terminals of the battery cell and the PCB.

FIG. 9 is a perspective view of a secondary battery pack according to another embodiment of the present invention configured so that an external input and output terminal is mounted to a PCB. Referring to FIG. 9, as previously described, a secondary battery pack 800 is configured to have a structure in which an external input and output terminal 530 is formed at one face of the PCB (not shown) so that the external input and output terminal 530 is exposed outside through a PCM case 520.

As is apparent from the above description, the secondary battery pack according to the present invention is configured so that the PCM 500, in which the protection circuit board electrically connected to the cathode terminal and the anode terminal of the battery cell is disposed in the case, is mounted to the sealed surplus portion formed at one face of the battery cell. Consequently, it is possible to effectively protect the PCM and to greatly reduce the number of parts constituting the secondary battery pack, thereby greatly improving manufacturing efficiency, as compared with the conventional secondary battery pack.

Also, the secondary battery pack according to the present invention is configured so that the protection circuit board is disposed in the electrically insulative case. Consequently, it is possible to protect and insulate the PCM including the protection circuit board. Also, it is possible to easily prevent the electrode terminals from being exposed outside without insulation of the electrode terminals through the use of additional members.

Furthermore, the secondary battery pack according to the present invention is configured so that the protection circuit board is mounted in the case. Consequently, it is possible to easily manufacture the secondary battery pack, to relatively reduce a defect rate, and to configure the secondary battery pack so that the secondary battery pack has no wrinkles formed at the outer face thereof, i.e. a neat and clean external appearance, as compared with the conventional secondary battery pack in which the PCM is insulated using a tape.

In addition, the secondary battery pack according to the present invention is configured so that the protection circuit board is mounted to the sealed surplus portion formed at one face of the battery cell. Consequently, it is possible to reduce the length of the sealed surplus portion and to increase the capacity of the battery pack per unit volume, as compared with the conventional secondary battery pack.

Meanwhile, in a general process of assembling the secondary battery pack, the connection members and the PCM are coupled, and an insulative tape is attached at each step, to the PCM assembly is mounted to the battery cell, as previously described. That is, the PCM assembly is mounted to the battery cell using a plurality of parts with the result that a plurality of processes is required, and structural stability as well as mechanical strength is low.

On the other hand, the protection circuit module according to the present invention is configured to have a structure in which the protection circuit board is mounted in the case, and therefore, it is possible to improve structural stability of the battery pack, to greatly simplify the process of manufacturing the battery pack, to secure excellent insulativity, and to maximize the capacity of the battery cell in the battery pack having the same standard as the conventional battery pack.

Also, in the manufacturing method according to the present invention, it is possible to protect and insulate the PCM using the case without an additional member, such as a label or an insulative tape. Also, the protection circuit board is electrically connected to the electrode terminals, the electrode terminals are bent, and then the protection circuit board is mounted in the case with the result that no exposed region is formed during the bending process, and therefore, an additional insulative member is not required.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery pack comprising:
 a battery cell comprising:
  a top wall having a front edge;
  a bottom wall having a front edge;
  a front wall;
  a sealed surplus portion extending outwardly from the front edge of the bottom wall;
  an anode terminal and a cathode terminal formed at one face having the sealed surplus portion; and
 a protection circuit module (PCM) electrically connected to the battery cell via the anode terminal and the cathode terminal, wherein the PCM comprises:
  a board having a protection circuit formed thereon, the board having a first major surface and a second major surface opposite the first major surface and being provided with an anode terminal connection part and a cathode terminal connection part connected to the anode terminal and the cathode terminal, respectively;
  a PCM case configured to receive the board through an open face thereof so that the PCM case surrounds the board; and
  an electrically insulative lid to close the open face of the PCM case, the insulative lid formed separately from the PCM case; and
  an external input and output terminal coupled to the board by an interconnection part that extends externally from the board through an opening formed in the PCM case, wherein the external input and output terminal extends perpendicularly from an external end of the interconnection part in a direction opposite to a direction in which the anode terminal connection part and the cathode terminal connection part face;
 wherein the board is coupled to the anode terminal and the cathode terminal of the battery cell via the anode terminal connection part and the cathode terminal connection part,
 wherein the board is configured to be disposed in the PCM case in a state in which the board is parallel to the battery cell when the open face of the PCM case is closed by the electrically insulative lid,
 wherein the PCM case is mounted on the sealed surplus portion of the battery cell when the board is disposed in the PCM case and the board is perpendicular to the battery cell,
 wherein the electrically insulative lid overlies the sealed surplus portion to form an exterior surface,
 wherein the external appearance of the board has four faces and the second major surface of the board faces the battery cell when the PCM case is mounted on the sealed surplus portion, and
 wherein the PCM case comprises a bottom wall, a first side wall extending in a first direction from a first side edge of the bottom wall and a second side wall extending in the first direction from a second side edge of the bottom wall, the second side wall having a first end edge extending upwardly from the bottom wall and a second end edge extending upwardly from the bottom wall, a width between the first end edge and the second end edge being less than a distance between the anode terminal and the cathode terminal, the second side wall extending between the anode terminal and the cathode terminal when the board is disposed in the PCM case.

2. The secondary battery pack according to claim 1, wherein the PCM case and the lid are coupled to each other through an assembly type fastening structure.

3. The secondary battery pack according to claim 2, wherein the PCM case is provided with at least one fastening groove for coupling with the lid, and the lid is provided with at least one fastening protrusion corresponding to the at least one fastening groove of the PCM case.

4. The secondary battery pack according to claim 1, wherein the battery cell is a plate-shaped battery cell, and the anode terminal and the cathode terminal are plate-shaped conductive members.

5. The secondary battery pack according to claim 1, further comprising an insulative tape additionally attached to an electrode terminal exposure region of the sealed surplus portion.

6. The secondary battery pack according to claim 5, wherein the insulative tape is a double-sided tape.

7. The secondary battery pack according to claim 1, further comprising an insulative tape additionally attached to at least one of outer faces of the PCM case.

8. The secondary battery pack according to claim 1, wherein the board is disposed in the PCM case in a state in which the board is parallel to the battery cell in an extension direction identical to an extension direction of the sealed surplus portion.

9. The secondary battery pack according to claim 1, further comprising a nickel plate additionally mounted to one face of the cathode terminal, to which the cathode terminal connection part of the board is coupled, by ultrasonic welding.

10. The secondary battery pack according to claim 1, further comprising a label to cover the battery cell.

11. The secondary battery pack according to claim 10, wherein the label is configured to have a structure to cover sealed outer circumferences of the battery cell.

12. The secondary battery pack according to claim 1, wherein the board moves from parallel to the battery cell to perpendicular to the battery cell by bending the anode terminal connection part and the cathode terminal connection part.

13. The secondary battery pack according to claim 1, wherein the electrically insulative lid comprises a top wall having a first side edge, a second side edge, a first flange and a second flange, the first flange and the second flange extending downwardly from the first side edge of the top wall.

14. A protection circuit module (PCM) comprising:
a protection circuit board having a first major surface and a second major surface opposite the first major surface and having an anode terminal connection part and a cathode terminal connection part connected to an anode terminal and a cathode terminal of a battery cell, respectively;
a PCM case configured to receive the protection circuit board through an open face thereof;
an electrically insulative lid to close the open face of the PCM case, the insulative lid formed separately from the PCM case; and
an external input and output terminal coupled to the board by an interconnection part that extends externally from the board through an opening formed in the PCM case, wherein the external input and output terminal extends perpendicularly from an external end of the interconnection part in a direction opposite to a direction in which the anode terminal connection part and the cathode terminal connection part face;
wherein the protection circuit board is coupled to the anode terminal and the cathode terminal of the battery cell via the anode terminal connection part and the cathode terminal connection part,
wherein the board is configured to be disposed in the PCM case in a state in which the board is parallel to the battery cell when the first major surface of the board is coupled to the anode terminal and the cathode terminal of the battery cell,
wherein the open face of the PCM case is closed by the electrically insulative lid,
wherein the PCM case is mounted on the sealed surplus portion of the battery cell when the board is disposed in the PCM case and the board is perpendicular to the battery cell,
wherein the external appearance of the board has four faces and the second major surface of the board faces the battery cell when the PCM case is mounted on the sealed surplus portion, and
wherein the PCM case comprises a bottom wall, a first side wall extending in a first direction from a first side edge of the bottom wall and a second side wall extending in the first direction from a second side edge of the bottom wall, the second side wall having a first end edge extending upwardly from the bottom wall and a second end edge extending upwardly from the bottom wall, a width between the first end edge and the second end edge being less than a distance between the anode terminal and the cathode terminal, the second side wall extending between the anode terminal and the cathode terminal when the board is disposed in the PCM case.

15. The protection circuit module according to claim 14, wherein the PCM case and the lid are coupled to each other through an assembly type fastening structure.

16. The protection circuit module according to claim 14, wherein the PCM case is provided with at least one fastening groove for coupling with the lid, and the lid is provided with at least one fastening protrusion corresponding to the at least one fastening groove of the PCM case.

17. The protection circuit module according to claim 14, wherein the PCM case is configured to have a hollow box structure opened at one face thereof.

18. The secondary battery pack according to claim 14, wherein the board moves from parallel to the battery cell to perpendicular to the battery cell by bending the anode terminal connection part and the cathode terminal connection part.

19. The secondary battery pack according to claim 14, wherein the electrically insulative lid comprises a top wall having a first side edge, a second side edge, a first flange and a second flange, the first flange and the second flange extending downwardly from the first side edge of the top wall.

* * * * *